US012560965B2

(12) United States Patent
Reber et al.

(10) Patent No.: US 12,560,965 B2
(45) Date of Patent: Feb. 24, 2026

(54) DOCK FOR MOBILE COMPUTING DEVICES

(71) Applicant: ZEBRA TECHNOLOGIES CORPORATION, Lincolnshire, IL (US)

(72) Inventors: David William Reber, Cedar Park, TX (US); Lawrence Allen Stone, Austin, TX (US); Mark Thomas Fountain, Hitchin (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/115,337

(22) Filed: Feb. 28, 2023

(65) Prior Publication Data

US 2024/0288899 A1    Aug. 29, 2024

(51) Int. Cl.
 *G06F 1/16* (2006.01)

(52) U.S. Cl.
 CPC .......... *G06F 1/1632* (2013.01); *G06F 1/1679* (2013.01)

(58) Field of Classification Search
 CPC .............................. G06F 1/1632; G06F 1/1679
 USPC ........................................ 361/679.41–679.44
 See application file for complete search history.

(56) References Cited

U.S. PATENT DOCUMENTS

| | | | | |
|---|---|---|---|---|
| 5,921,697 A | * | 7/1999 | Karl ...................... | G06F 1/1632 403/63 |
| 6,532,152 B1 | * | 3/2003 | White ................... | G06F 1/1656 312/223.1 |
| 9,429,360 B2 | * | 8/2016 | Hsiao ................. | H01R 13/5202 |
| 9,535,457 B1 | * | 1/2017 | Vier ........................ | B60R 11/02 |
| 10,976,777 B2 | * | 4/2021 | Pischel ................... | H04M 1/04 |
| 2013/0107445 A1 | * | 5/2013 | Reber ................... | G06F 1/1632 361/679.41 |
| 2017/0028811 A1 | * | 2/2017 | Jayasundera ........ | A61B 5/6893 |
| 2018/0107248 A1 | * | 4/2018 | Pischel ............... | H05K 5/0221 |
| 2018/0184533 A1 | * | 6/2018 | Katsuyama ........... | G06F 1/1632 |
| 2021/0048848 A1 | * | 2/2021 | Pischel ................. | G06F 1/1656 |
| 2022/0302947 A1 | * | 9/2022 | Hettinger ............... | F16M 11/10 |
| 2022/0352682 A1 | * | 11/2022 | Carnevali ............. | G06F 1/1632 |
| 2023/0026242 A1 | * | 1/2023 | Chang ................... | G06F 1/1662 |

* cited by examiner

*Primary Examiner* — Allen L Parker
*Assistant Examiner* — Peter Krim

(57) ABSTRACT

A dock for a computing device includes: a housing including a cradle end wall defining a closed end of a channel configured to receive a computing device along a travel direction, and a rear cradle wall extending between the cradle end wall and an open end of the channel; a latch movably supported at the rear cradle wall between (i) an engaged position extending into the channel to engage with the computing device, and (ii) a retracted position withdrawn from the channel to disengage from the computing device; a bias member configured to bias the latch towards the engaged position to automatically engage with the computing device in response to insertion of the computing device into the channel; and an actuator coupled to the latch, the actuator configured to transition the latch to the disengaged position for releasing the computing device from the channel.

21 Claims, 12 Drawing Sheets

DOCK FOR MOBILE COMPUTING DEVICES

BACKGROUND

A mobile computing device, such as a tablet computer or a laptop computer, can be affixed to a dock to support the computing device in a variety of operating environments (e.g., in a vehicle, on a desk or other support surface, or the like), while providing power and/or data connectivity to the computing device. Environmental factors such as impacts, vibration, or the like may interfere with power and data connectivity, and/or with retention of the computing device by the dock.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
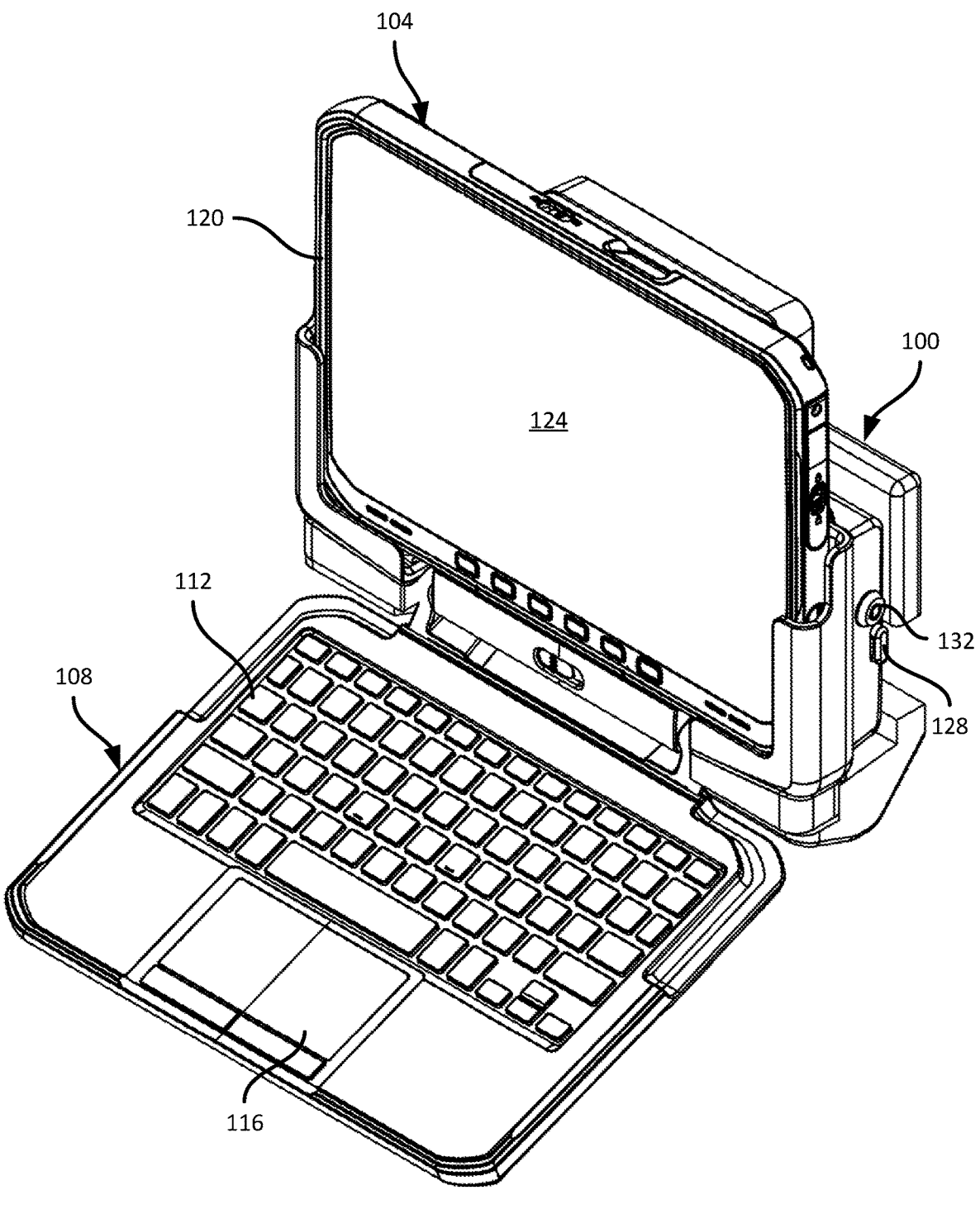
FIG. 1 is a diagram of a dock and a computing device mounted to the dock.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a dock for a computing device, the dock comprising: a housing including a cradle end wall defining a closed end of a channel configured to receive a computing device along a travel direction, and a rear cradle wall extending between the cradle end wall and an open end of the channel; a latch movably supported at the rear cradle wall between (i) an engaged position extending into the channel to engage with the computing device, and (ii) a retracted position withdrawn from the channel to disengage from the computing device; a bias member configured to bias the latch towards the engaged position to automatically engage with the computing device in response to insertion of the computing device into the channel; and an actuator coupled to the latch, the actuator configured to transition the latch to the retracted position for releasing the computing device from the channel.

FIG. 1 illustrates a dock 100 for a computing device 104, such as a tablet computer, laptop computer, or the like. In the present example, the computing device 104 is a tablet computer removably coupled with an input module 108 having a keyboard 112 and touch pad 116. The computing device 104, in other words, is capable of "two-in-one" functionality, in that the computing device 104 has a tablet form factor when the input module 108 is not present, and a laptop form factor when the input module 108 is present. The computing device 104 includes a housing 120 supporting various components of the computing device 104, including a display 124 (e.g., integrated with a touch screen in some examples).

The dock 100 is configured to releasably secure the computing device 104, permitting the computing device 104 to be affixed to a work surface such as a desk, a mounting structure in the can of a vehicle, or the like. As discussed below, the dock 100 includes certain structural features to facilitate insertion and removal of the computing device 104 into the dock 100. For example, those structural features may simplify the insertion and removal of the computing device 104 into and from the dock 100, while mitigating accidental removal or partial removal of the computing device 104 from the dock 100 due to shocks, vibrations, or the like. As discussed further below, the dock 100 can also include a locking mechanism including a locking bar 128 and a lock 132.

Figure 2:
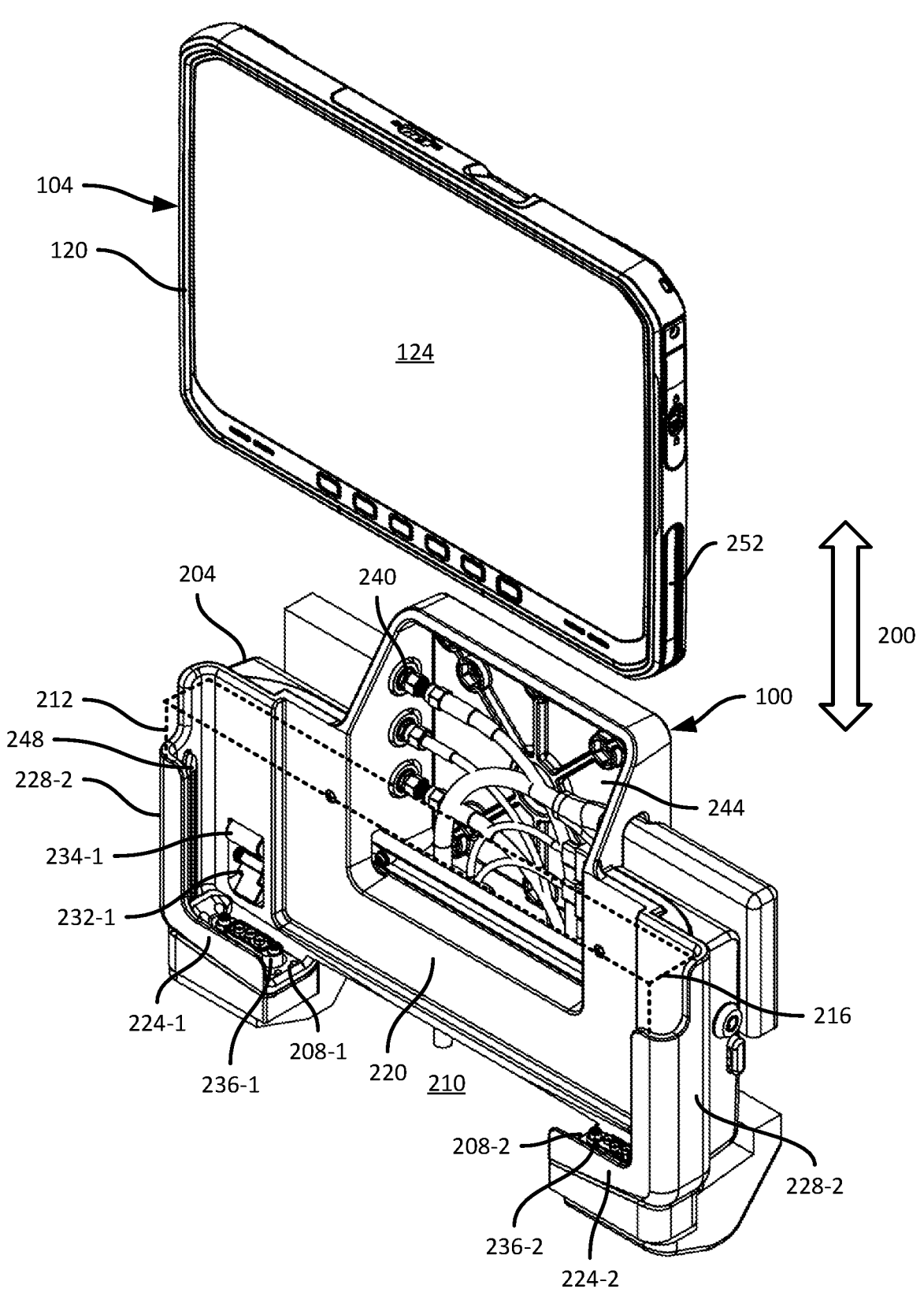
FIG. 2 is a diagram of the dock of FIG. 1, with the computing device removed therefrom.

Turning to FIG. 2, the dock 100 and computing device 104 (with the input module 108 removed) are shown in a disassembled configuration, e.g., after the computing device 104 has been withdrawn from the dock 100. The computing device 104 is inserted and withdrawn into and from the dock 100 along a travel direction 200, which is illustrated as vertical, but need not be vertical in some implementations. For example, the dock 100 can be mounted within a vehicle to place the computing device 104 at an angle other than that shown in FIGS. 1 and 2 (e.g., to place the display 124 in a portrait orientation rather than the illustrated landscape orientation).

The dock 100 comprises a dock housing 204 that includes a plurality of walls with various shapes and functions. The walls of the housing 204 include a cradle end wall, which in the illustrated embodiment is implemented as two end walls 208-1 and 208-2 (collectively referred to as end walls 208, and generically referred to as an end wall 208; similar nomenclature is used herein for other components with numbered suffixes), with a cutout 210 therebetween to accommodate the input assembly 108 (when present). In other examples, the housing 204 can include a single continuous end wall, rather than the divided end walls 208 shown in FIG. 2. The end walls 208 form a closed end of a channel 212 illustrated in dashed lines in FIG. 2. The channel 212 is referred to as having a closed end defined by the end walls 208 despite the presence of the cutout 210 (rendering the channel 212 partially open at that end) because the channel 212 is closed to passage of the computing device 104.

The channel 212 is a volume of space defined by the dock housing 204, including, in part, by the walls 208. The channel 212 is the space in which the computing device 104 travels (according to the travel direction 200) to engage and disengage with the dock 100. The channel 212 includes an open end 216 opposite the closed end defined by the end walls 208. The open end 216 is located, in the illustrated example, at an end of a rear cradle wall 220 of the housing 204. The rear cradle wall 220 and the end walls 208, in other words, define extents of the channel 212. The housing 204 can also include forward cradle walls 224-1 and 224-2, and side cradle walls 228-1 and 228-2, defining further boundaries of the channel 212. The cradle end walls 208 can be substantially perpendicular to the travel direction 200, and the rear cradle wall 220 can be substantially parallel to the travel direction 200.

The dock 100 also includes a latch 232-1 supported at the rear cradle wall 220. For example, the latch 232-1 can be supported within a latch chamber defined by the housing 204 and open at the rear cradle wall 220. The latch 232-1, as discussed below, is movable between an engaged position extending into the channel 212 (as shown in FIG. 2) to engage with the computing device 104, and a retracted position withdrawn from the channel 212 to disengage from the computing device 104. The computing device 104 includes certain structural features facilitating engagement by the latch 232-1. The dock 100, in this example, also includes a second latch that is obscured by the side wall 228-2 in FIG. 2.

The dock 100 can also include a retention element 234-1 disposed adjacent to the latch 232-1. In this example, the retention element 234-1 is a resilient roller (e.g., made of rubber or another suitable material) rotatably supported within the same latch chamber as the latch 232-1. The roller 234-1 can be configured to extend into the channel 212, and bias the computing device 104 towards the forward cradle walls 224. Such biasing can reduce movement of the computing device 104 within the channel 212 during use, and the provision of a rolling retention element 234-1 can reduce engagement between the retention element 234-1 and the housing 120 of the computing device 104 during insertion and removal of the computing device 104 in the dock 100, which may otherwise impede such insertion and removal. The dock 100 can also include a corresponding retention element adjacent to the second latch mentioned above.

As discussed below, the latches 232 of the dock 100 permit the computing device 104 to be inserted and secured within the dock 100 in a single motion, e.g., without requiring manual activation of a securing mechanism distinct from the latches 232, and without requiring direct manual interaction with the latches 232 to secure the computing device 104. Further, the dock 100 includes an actuator (not visible in FIG. 2, and discussed further below) permitting simple release of the latches 232 to remove the computing device 104 from the dock 100.

The dock 100 can also include one or more connectors configured to engage with corresponding ports of the computing device 104 to supply power and/or data connectivity to the computing device 104. In the illustrated example, the dock 100 includes a first connector 236-1, and a second connector 236-2, disposed on the end walls 208-1 and 208-2, respectively. Inserting the computing device 104 into the dock 100 therefore engages the above-mentioned ports of the computing device 104 with the connectors 236 (also referred to as primary connectors 236). As seen in FIG. 2, the latch 232-1 is disposed in line with the connector 236-1 (that is, aligned according to the direction of travel 200). Further, the latch 232-1 is disposed closer to the end wall 208-1 than to the open end 216 of the channel 212. The proximity of the latch 232-1 to the end wall 208-1, and the alignment of the latch 232-1 with the connector 236-1, may mitigate interruptions in power and/or data connectivity due to shocks, vibrations, or the like while the computing device 104 is mounted in the dock 100.

The primary connectors 236 can be electrically connected to one or more external devices (e.g., computing devices, transceivers, and the like) via secondary connectors 240 contained in an input/output (I/O) chamber 244 defined by the housing 204 of the dock 100. In the illustrated example, the I/O chamber 244 contains six secondary connectors (e.g., three antenna pass-through connectors and three universal serial bus, USB, connectors), but it will be understood that a wide variety of combinations of secondary connectors can be provided in the I/O chamber, depending on the configurations of the primary connectors 236. The dock housing 204 contains wiring between each primary connector 236 and a subset of the secondary connectors 240. The secondary connectors 240 are then connected to suitable external devices, e.g. via cables or the like exiting the dock housing 204. As will be apparent, the I/O chamber 244 is accessible from a front of the dock 100 (e.g., the side of the dock 100 that carries the computing device 104 in operation) when the computing device 104 is absent. When the computing device 104 is present, access to the I/O chamber 244 is substantially obstructed. In some examples, the dock 100 can include an access door (not shown) covering the I/O chamber 244, which is prevented from opening by the computing device 104 when the computing device 104 is present.

The dock 100 can also include structural features for guiding the computing device 104 during insertion of the computing device 104 into the channel 212. For example, the dock 100 can include one or more rails 248 extending into the channel, configured to engage with corresponding grooves 252 on the computing device 104. The rails 248 and grooves 252 can therefore ensure correct alignment of the computing device 104 within the channel 212.

Figure 3:
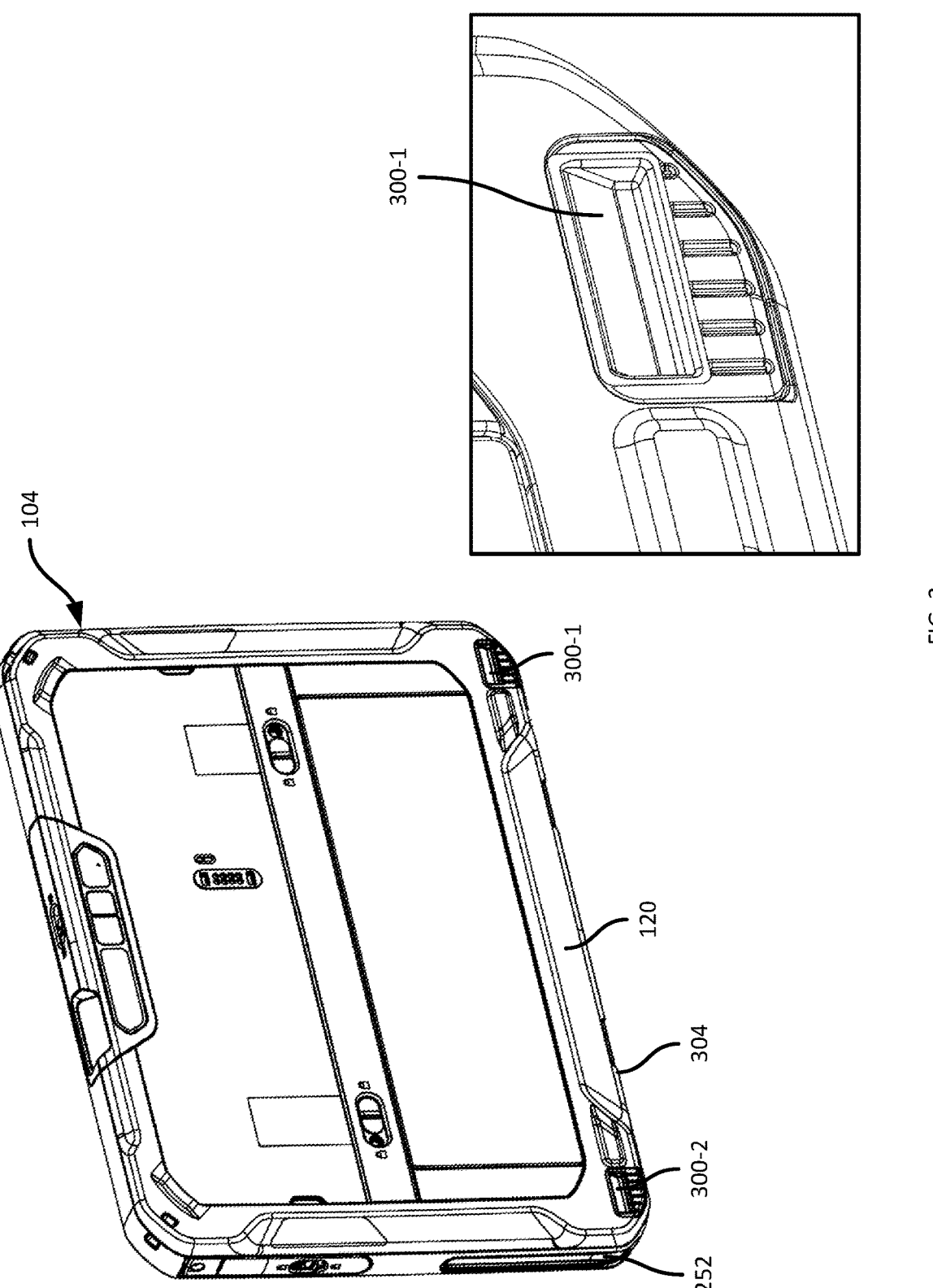
FIG. 3 is a rear view of the computing device of FIGS. 1 and 2.

Turning to FIG. 3, a back side of the computing device 104 is shown (e.g., opposite the display 124), to illustrate structural features of the computing device 104 that facilitate engagement by the latches 232 of the dock 100. In particular, the housing 120 of the computing device 104 defines recesses 300-1 and 300-2 on the back side thereof, corresponding to the latches 232. In other examples, e.g., in which the dock 100 includes three latches rather than the two discussed herein, the computing device 104 can include three corresponding recesses 300. The recesses 300 are disposed adjacent to a lower side 304 of the housing 204, e.g., carrying the previously mentioned ports. The recesses 300 are placed so as to be adjacent to the latches 232 of the dock 100 when the computing device 104 is inserted into the dock 100, permitting the latches 232 to engage with the recesses 300 and obstruct withdrawal of the computing device 104 from the dock 100. The recesses 300 can, in some examples, be fabricated of a distinct material from the surrounding portions of the housing 204. For example, the recesses 300 can be fabricated from metal or other suitable materials with a greater hardness than the material of the remainder of the exterior of the housing 204 (which may be a combination of plastic, rubber, or the like).

Figure 4:
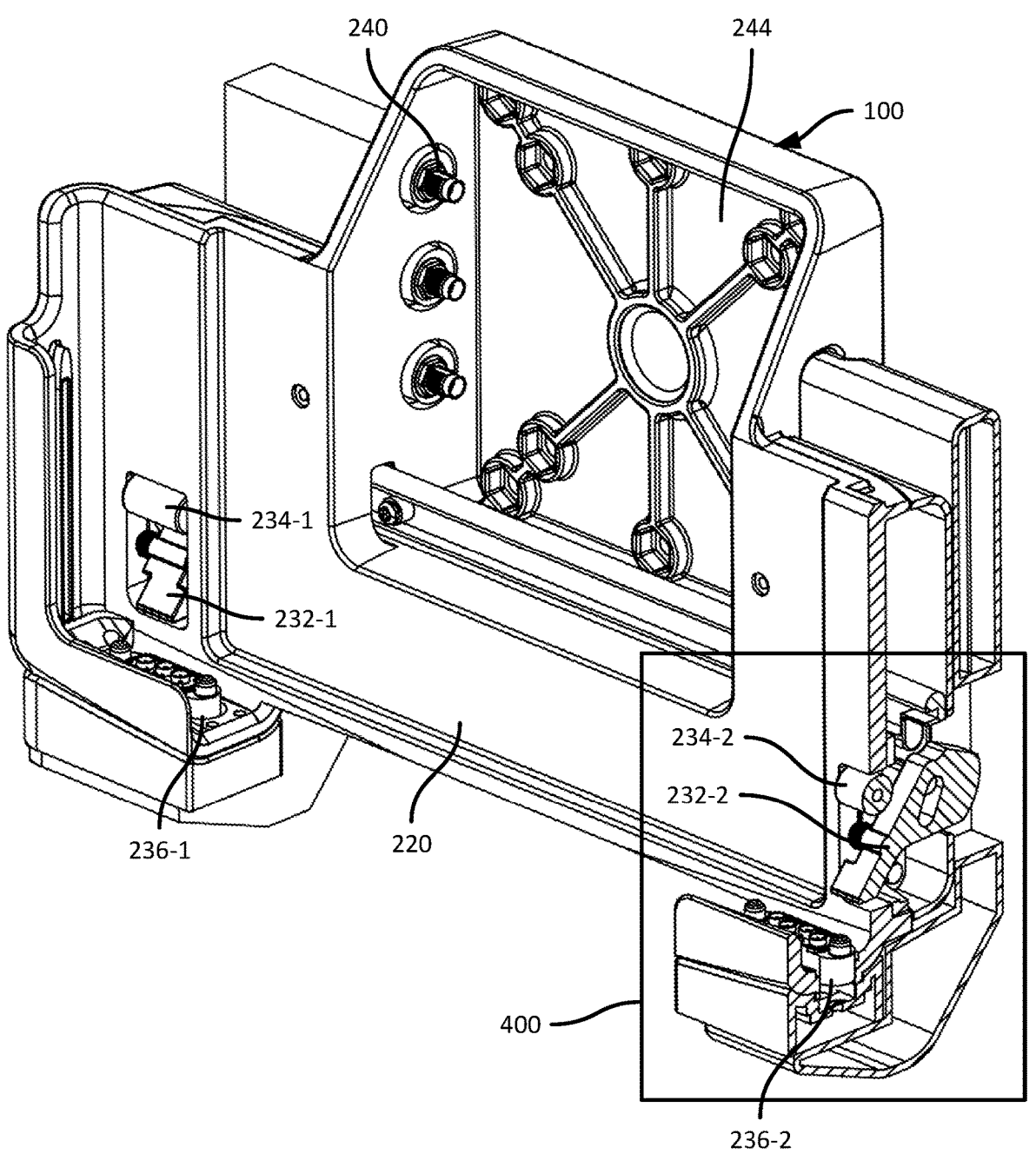
FIG. 4 is a partial cross section of the dock of FIG. 2.

Turning to FIG. 4, the dock 100 is shown in isolation, with the cables connected to the secondary connectors 240 omitted. FIG. 4 further illustrates a cross section of the dock 100, sectioning a latch 232-2 and a second retention element 234-2. The portion 400 of the cross section of FIG. 4 is illustrated in greater detail in FIG. 5.

Figure 5:
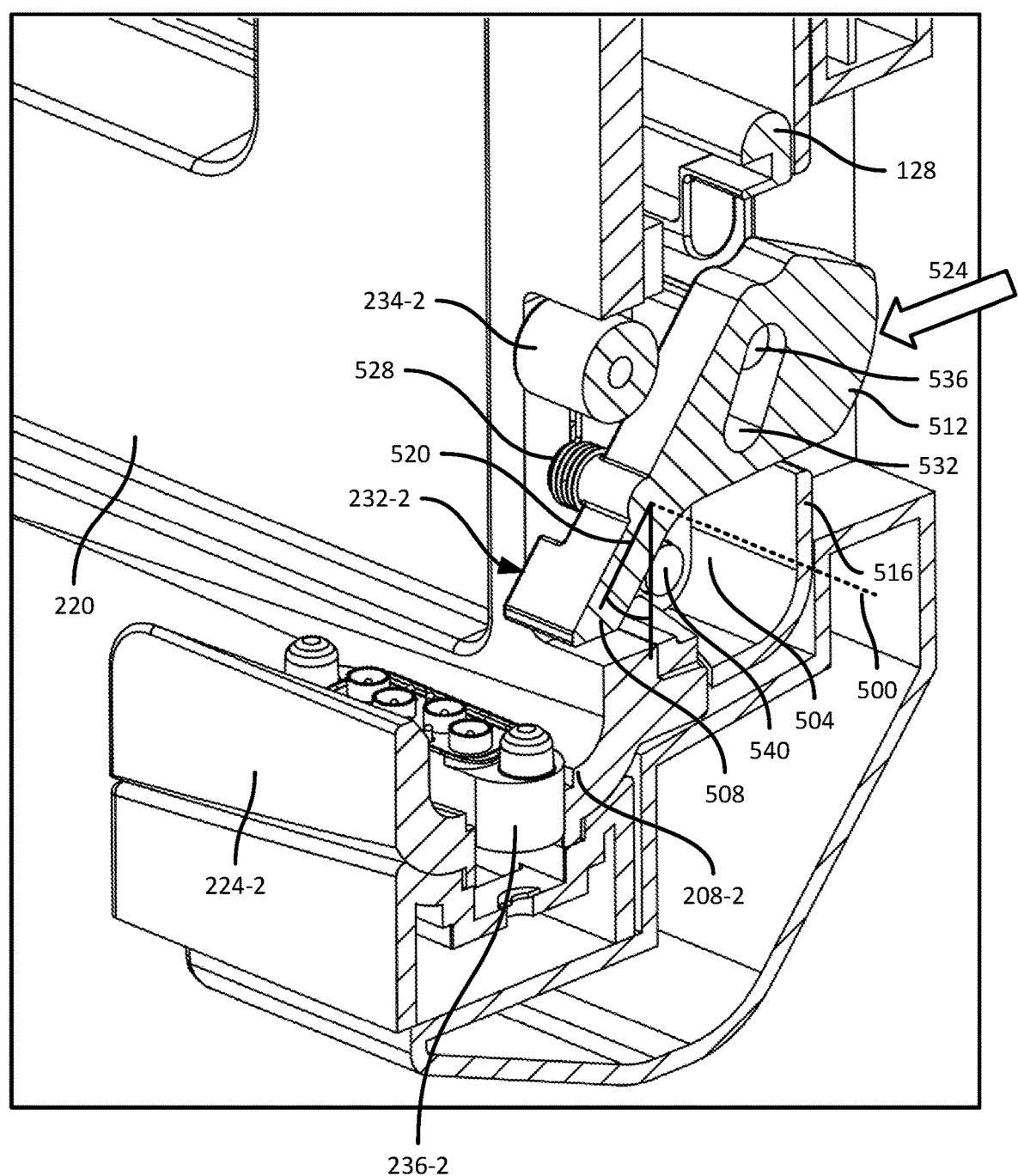
FIG. 5 is a detailed view of the partial cross section of FIG. 4.

Referring to FIG. 5, the latch 232-2 is shown in greater detail. It will be understood that the features discussed in connection with the latch 232-2 are also present in the latch 232-1 and surrounding portions of the dock 100. The latch 232-2 is movably supported at the rear wall 220, such that a portion of the latch 232-1 can extend into the channel 212. In this example, the latch 232-2 is rotatable about an axis 500, e.g., mounted within a latch chamber 504 defined in the housing 204 of the dock 100. In the illustrated example, the retention elements 234 are supported within respective latch chambers 504, but in other examples the retention elements 234 can be disposed outside the latch chamber, e.g., in a separate recess defined in the rear cradle wall 220.

The latch chamber 504 is open at the rear wall 220, to permit extension of the latch 232-2 into the channel 212. The latch 232-2 includes an arm 508 extending from the axis 500 towards the channel 212 (e.g., in the direction of the end wall 208-2), and a protrusion 512 extending in an opposite direction from the axis 500. The protrusion 512 extends through an opening in a back wall 516 of the housing 204, enabling the protrusion 512 to be accessed from an exterior of the dock 100 when the computing device 104 is mounted on the dock 100. The latch chamber 504, in other words, is open to both the channel 212 and the exterior of the dock 100 on an opposite side of the dock 100 from the channel 212.

Further, while the arm 508 extends downwards, towards the end wall 208-2, the protrusion 512 extends upwards, away from the end wall 208-2. An angle 520 at which the arm 508 and the protrusion 512 extend away from the axis 500 (relative to the direction of travel 200, which is parallel with the rear cradle wall 220 in this example) is less than ninety degrees. In the illustrated example, the angle 520 is less than forty-five degrees (e.g., about thirty-five degrees). The acute angle 520 between the arm 508 and the direction of travel 200 (e.g., represented by the rear wall 220 in FIG. 5) permits the arm 508 to effectively resist movement of the computing device 104 out from the channel 212, when the arm 508 is engaged with the recess 300-2 of the computing device 104. In other words, the angle of the latch 232-2 mitigates accidental disengagement of the computing device 104 from the dock 100.

Withdrawal of the computing device 104 instead involves pressing inwards (in a direction 524) on the protrusion 512, which rotates the latch 232-2 about the axis 500 and withdraws the arm 508 from the channel 212 into the latch chamber 504. The protrusion 512, in other words, implements the previously mentioned actuator for releasing the latch 232.

The latch 232-2 can also be biased towards the engaged position as illustrated, e.g., by a spring 528 or other suitable bias member. As a result, during insertion of the computing device 104 into the channel 212, the latch 232-2 is displaced from the engaged position to the retracted position, until the recess 300-2 is disposed beside the latch 232-2. When the recess 300-2 is beside the latch 232-2, the spring 528 causes the latch 232-2 to return to the engaged position, extending into the channel 212 and therefore into the recess 300-2. The computing device 104 is therefore secured to the dock 100 automatically via insertion into the channel 212. That is, the computing device 104 can be secured to the dock 100 without any secondary operations to activate the latch 232-2.

As also shown in FIG. 5, the latch 232-2 includes a transverse channel 532 extending therethrough. The channel 532 is referred to as transverse because the channel 532 extends through the latch 232-2 in a direction orthogonal to the plane in which the latch 232-2 rotates about the axis 500. The channel 532 is configured to receive a first extension 536 of a force transfer member movably supported within the dock housing 204. The force transfer member can be, for example, rotatable about an axis 540 supported by a fixed wall within the dock housing 204. As discussed further below, the force transfer member facilitates the movement of both latches 232 when one latch 232 is depressed in the direction 524.

Figure 6:
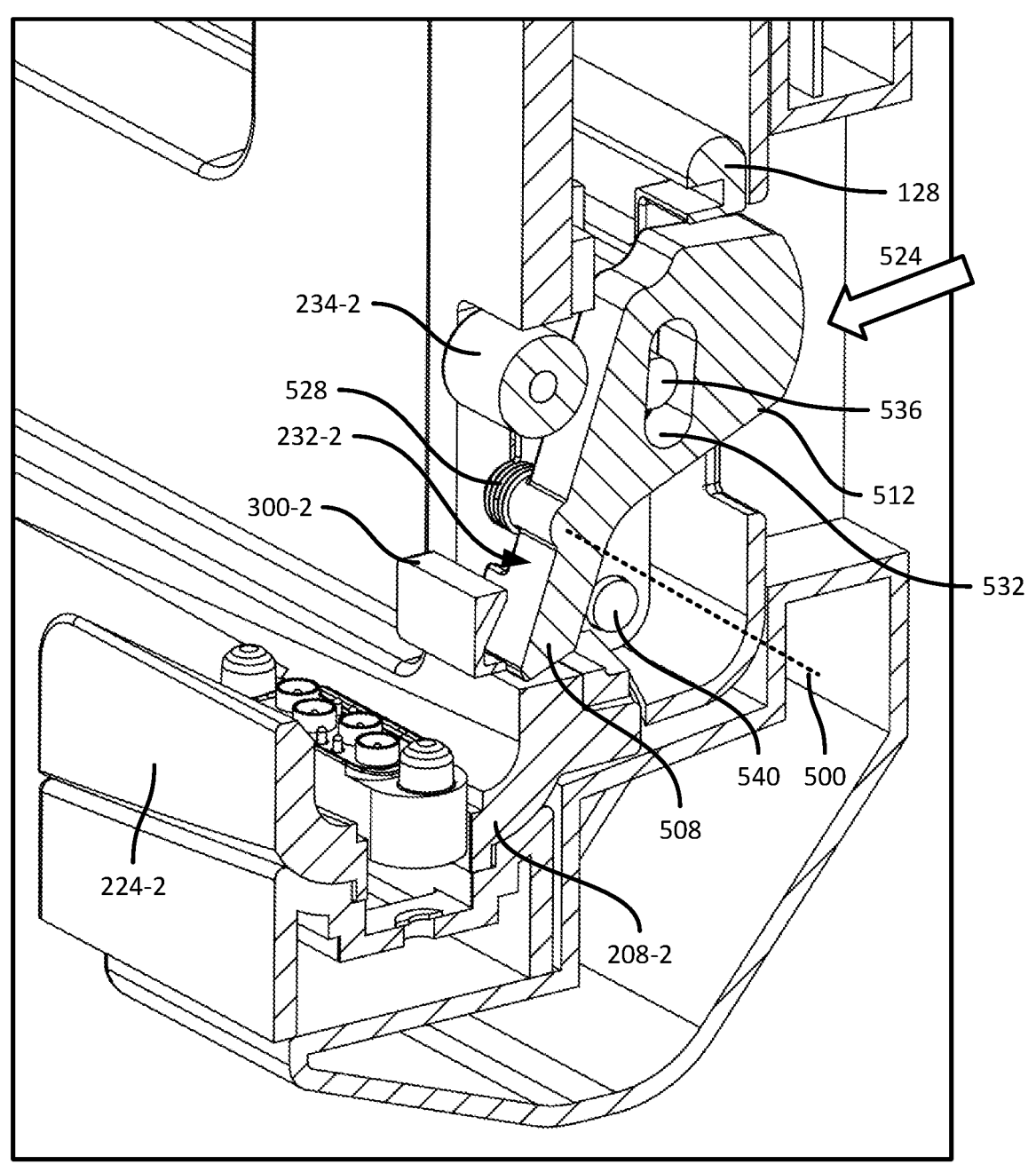
FIG. 6 is a detailed view of the partial cross section of FIG. 4, with a latch of the dock in a retracted position.

FIG. 6 illustrates the latch 232-2 following application of a force to the protrusion 512 along the direction 524, e.g., by an operator of the dock 100 and/or computing device 104. Pressing inwards on the protrusion 512 rotates the latch 232-2 about the axis 500 into the retracted position, withdrawing the arm 508 from the channel 212, and therefore also from the recess 300-2 (shown in isolation from the remainder of the computing device 104 for clarity). The computing device 104 can then be withdrawn from the channel 212. Removing the force applied to the protrusion 512 permits the latch 232-2 to return (under the action of the spring 528) to the engaged position.

Figure 7A:
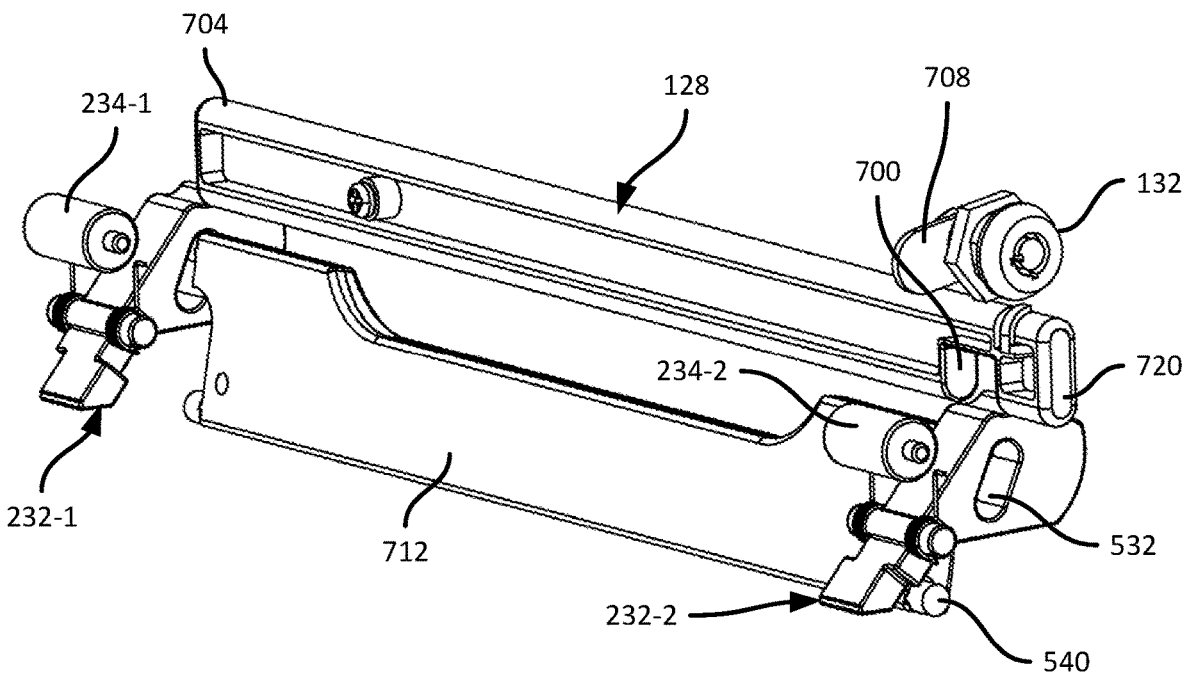
FIG. 7A is a diagram illustrating a locking mechanism of the dock in an unlocked position.
Figure 7B:
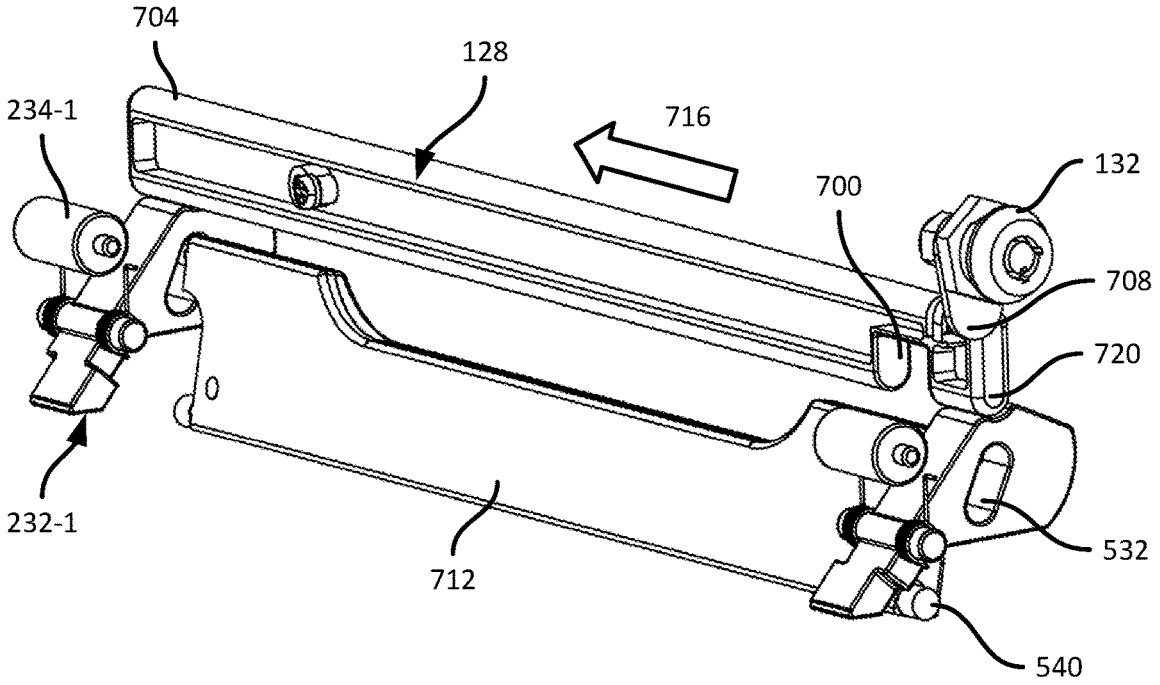
FIG. 7B is a diagram illustrating the locking mechanism of FIG. 7A in a locked position.

Turning to FIGS. 7A and 7B, the latches 232, locking bar 128, lock 132 are shown in isolation, with the dock housing 204 and other components of the dock 100 omitted. The locking bar 128 is slidably mounted within the housing 204 between an unlocked position shown in FIG. 7A and a locked position shown in FIG. 7B. The locking bar 128 includes a slot 700 that, when the locking bar 128 is in the unlocked position, is aligned with the latch 232-2, permitting the latch 232-2 to travel through the slot 700. An end 704 of the locking bar is positioned so as not to obstruct movement of the latch 232-1 in the unlocked position. In the unlocked position, in other words, the locking bar 128 does not impede the movement of the latches 232 from the engaged position to the retracted position. The lock 132 includes a tab 708 that is rotatable (e.g., via insertion and rotation of a key in a body of the lock 132) between an open position shown in FIG. 7A, and a closed position shown in FIG. 7B.

FIGS. 7A and 7B also illustrate the previously mentioned force transfer member 712. The force transfer member 712, as noted above, rotates within the dock housing 204 about the axis 540, and engages with the latches 232 via respective channels 532 of each latch 232. Rotation of one latch 232 towards the engaged or retracted position therefore, via the force transfer member 712, also rotates the other latch towards the same position.

To lock the latches 232, e.g., to prevent the latches from being moved to the retracted position, the locking bar 128 can be shifted in a direction 716 to place the slot 700 out of alignment with the latch 232-2, such that a portion 720 of the locking bar 128 is disposed over the latch 232-2, preventing the latch 232-2 from rotating to the retracted position. The end 704 of the locking bar 128 can also be disposed over the latch 232-1, preventing the latch 232-1 from rotating to the retracted position. The tab 708 retains the locking bar 128 in the locked position until the lock 132 is activated to return the tab 708 to the open position shown in FIG. 7A.

Figure 8:
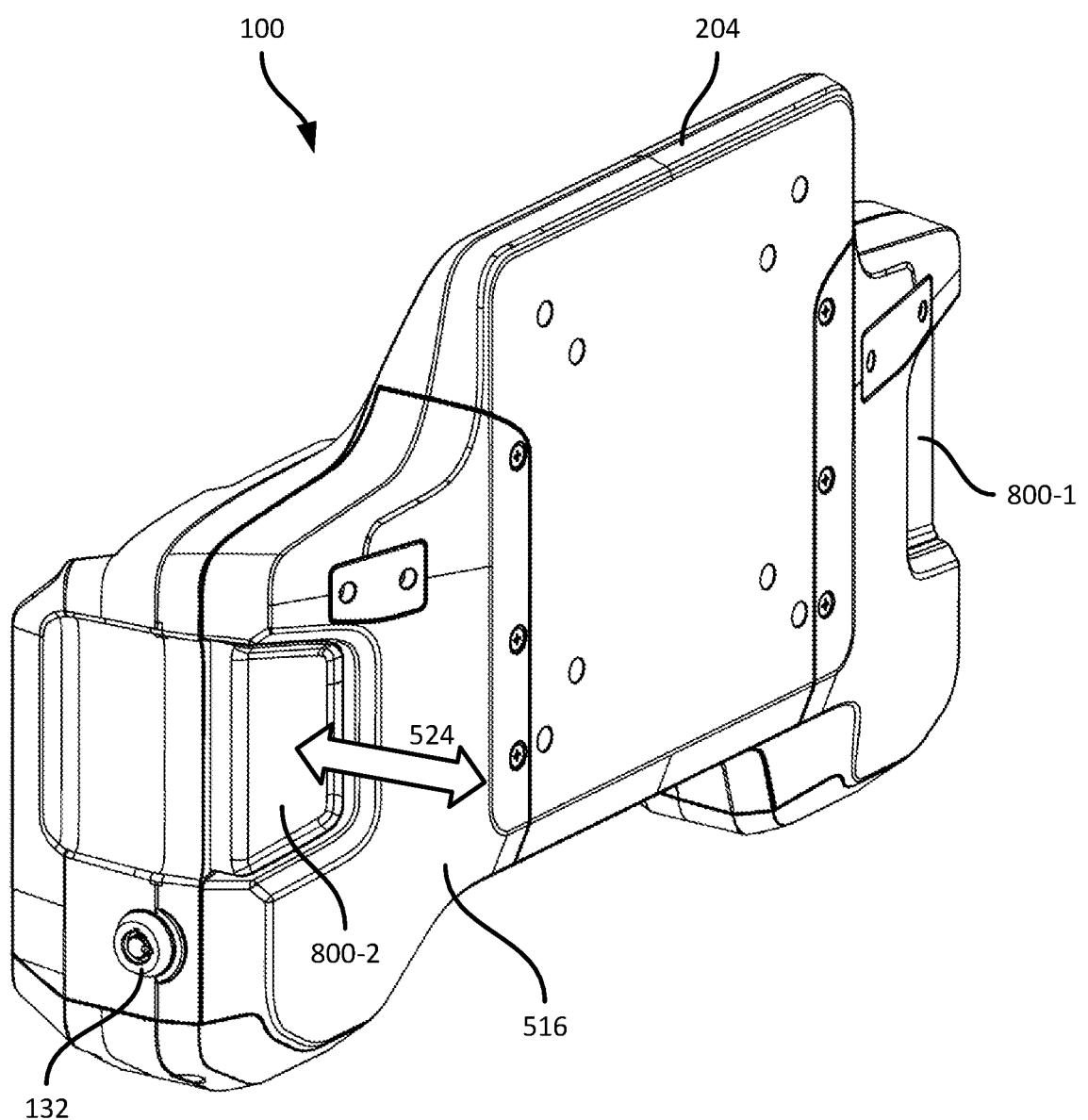
FIG. 8 is a diagram of a dock according to another embodiment.

Turning to FIG. 8, the dock 100 is shown according to another embodiment. In the illustrated embodiment, the dock 100 includes actuators 800-1 and 800-2, corresponding to the latches 232-1 and 232-2 respectively. The actuators 800, e.g., implemented as paddles, buttons, or the like, are slidably mounted within the dock housing 204 and are configured to move between retracted positions and engaged positions, along the direction 524. An inner surface of each actuator 800 is configured to engage with a corresponding latch 232, such that depressing the actuator 800 towards the rear cradle wall 220 (e.g., to the left, in the orientation shown in FIG. 8) moves the corresponding latch 232 to the retracted position.

Figure 9:
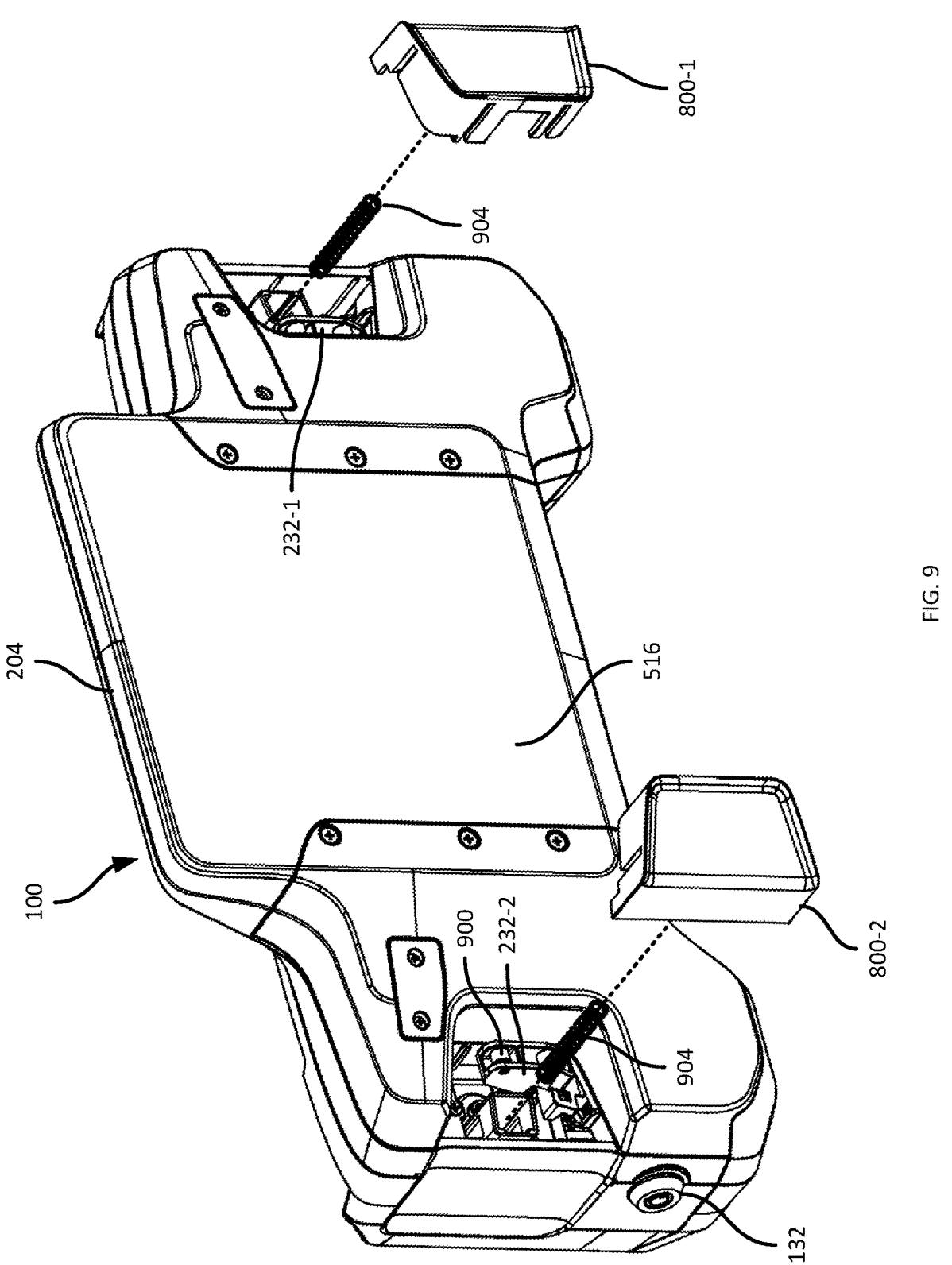
FIG. 9 is a partially exploded view of the dock of FIG. 8.

FIG. 9 illustrates a partially exploded view of the dock 100 of FIG. 8. The latches 232-1 and 232-2 are visible within the dock housing 204, and the actuators 800 are slidable within channels extending from the latch chambers 504 housing the latches 232 to an exterior of the dock 100. The actuators 800, in the present example, are biased to an engaged position, e.g., by bias members 904 such as springs. When the actuators 800 are in the engaged position, the latches 232 are also in the engaged position. The latches 232 can include, in this example, rollers 900 or other bearing elements to contact the actuators 800, e.g., to reduce surface binding between the latches 232 and the actuators 800.

Figure 10A:
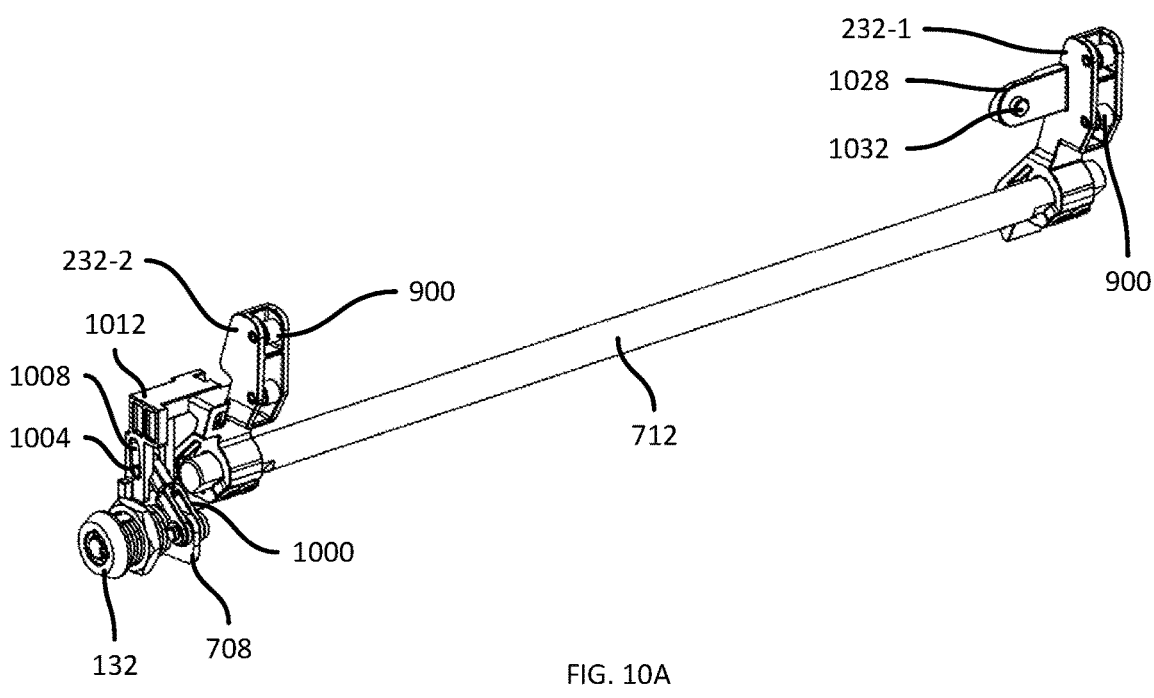
FIG. 10A is a diagram illustrating a locking mechanism of the dock of FIG. 8 in an unlocked position.
Figure 10B:
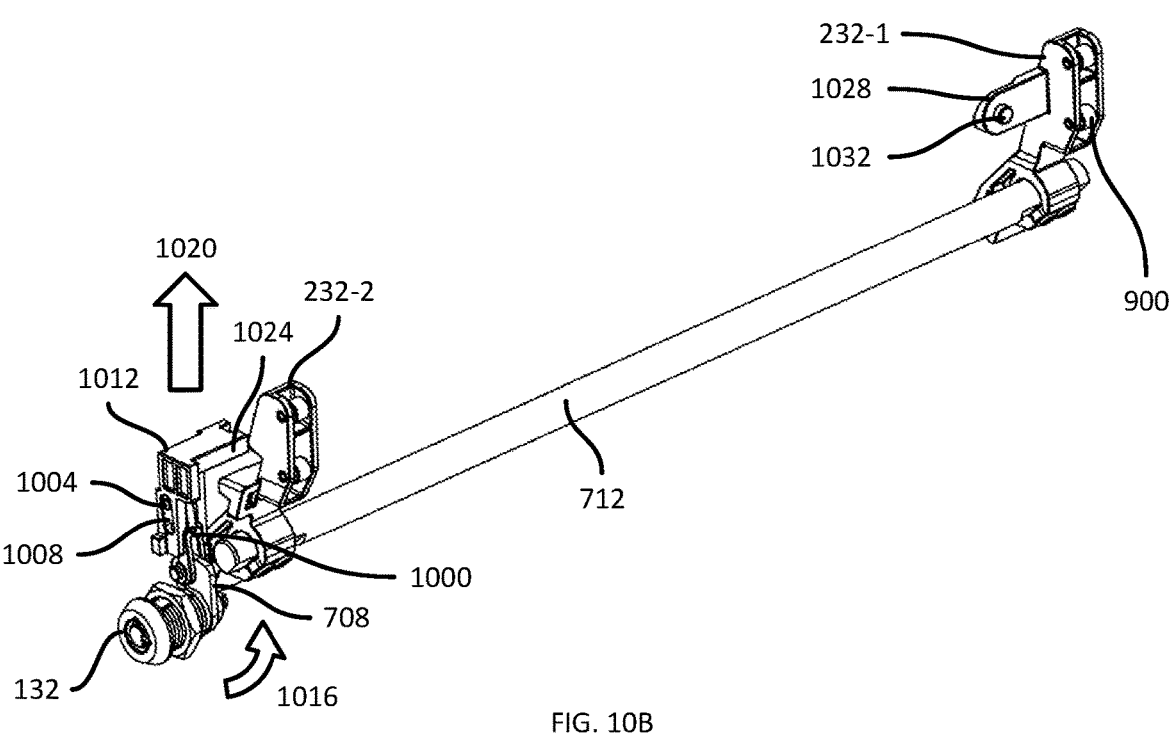
FIG. 10B is a diagram illustrating a locking mechanism of the dock of FIG. 8 in a locked position.

Referring to FIGS. 10A and 10B, a locking mechanism for the dock 100 as shown in FIG. 8 is illustrated, isolated from the remainder of the dock 100. In the embodiment shown in FIGS. 10A and 10B, the force transfer member 712 is implemented as a substantially cylindrical shaft affixed to each latch 232, which may occupy a smaller volume within the dock housing 204 than the force transfer member shown in FIG. 7. The tab 708 coupled to the lock 132, in this example, is connected to a locking member via a mechanical linkage. For example, the tab 708 is rotatably coupled to an arm 1000, which in turn supports a pin 1004 slidably within a channel 1008 defined by the locking member 1012. In a locked position, shown in FIG. 10A, the locking member 1012 abuts the latch 232-2, preventing the latch 232-2 from moving to the retracted position.

Unlocking the lock 132 rotates the tab 708 in a direction 1016, lifting the locking member 1012 in the direction 1020, such that a strike surface 1024 of the locking member 1012 no longer abuts the latch 232-2, and the latch 232-2 is permitted to rotate towards the retracted position.

As also shown in FIG. 10A and FIG. 10B, the latch 232-1 can include a paddle 1028 extending, for example, towards the latch 232-2. The paddle 1028 can include a protrusion 1032, e.g., extending toward the back wall 516 of the housing 204. As discussed below in connection with FIG. 11, the protrusion can be configured to activate a sensor when the latch 232-1 is in the engaged position.

Figure 11:
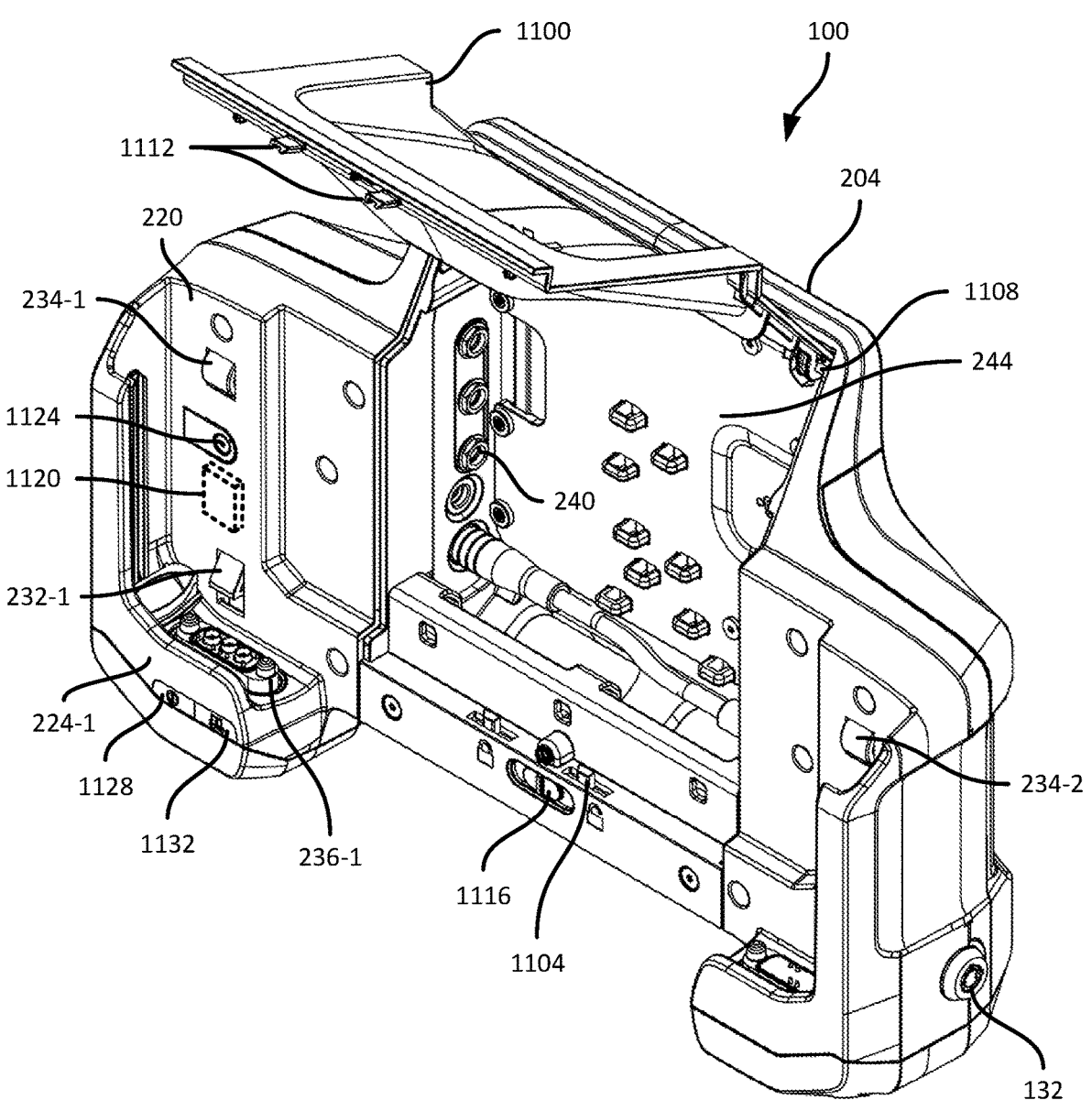
FIG. 11 is a diagram of the dock of FIG. 8, illustrating an input/output chamber cover.

FIG. 11 illustrates the dock 100 of FIG. 8 from a forward side. As shown in FIG. 11, the retention elements 234 can be supported by the rear cradle wall 220 at locations separated from the latches 232 (e.g., outside the latch chambers 504). The dock 100 in the illustrated example also includes a cover 1100 configured to enclose the I/O chamber 244 in a closed position, and permit access to the I/O chamber in the open position shown. The dock 100 can include one or more hooks 1104 movably supported by the dock housing 204. The cover 1100 can be configured to rotate about an axis 1108, and can include one or more tabs 1112 that are configured to engage with the hooks 1104. The hooks 1104 can be moved, e.g., by a slider 1116, to release the tabs 1112 and permit the cover 1100 to open. As will be apparent, therefore, when the computing device 104 is mounted to the dock 100 and the lock 132 is engaged (e.g., preventing removal of the computing device 104), the cover 1100 cannot be opened, and access to the I/O chamber 244 is prevented.

As also shown in FIG. 11, the dock 100 an integrated controller 1120, e.g., one or more integrated circuit components supported on a circuit board or the like within the housing 204. The controller 1120 can be connected with a sensor 1124, such as a button, configured to be depressed by the protrusion 1032 of the latch 232-1, when the latch 232-1 is in the engaged position. The dock 100 can also include, e.g., on the forward cradle wall 224-1, indicator lights such as a power indicator 1128 and a docking indicator 1132. The indicators 1128 and 1132 can be implemented, for example, as light emitting diodes (LEDs) or the like. The controller 1120 can be configured to enable the indicator 1128 when power is supplied to the dock 100 (e.g., from an external power source, such as a vehicle to which the dock 100 is mounted).

The controller 1120 can also be configured to control the indicator 1132 based on the detected presence or absence of the computing device 104 in the dock 100. For example, when the sensor 1124 is activated, indicating that the latch 232-1 is in the engaged position, the controller 1120 can activate the indicator 1132 (e.g., to emit green light) if the computing device 104 is detected via the connector 236-1 or 236-2 within a threshold time period (e.g., 0.5 seconds, although shorter or longer time periods can be employed). If the computing device 104 is not detected, the controller 1120 can disable the indicator 1132. When the sensor 1124 is not activated, indicating that the latch 232-1 is in the retracted position, but no computing device 104 is detected within the threshold time, the controller 1120 can control the indicator 1132 to generate an incomplete docking notification (e.g., flashing red light), as the computing device 104 may have been only partially inserted in the channel 212.

Figure 12:
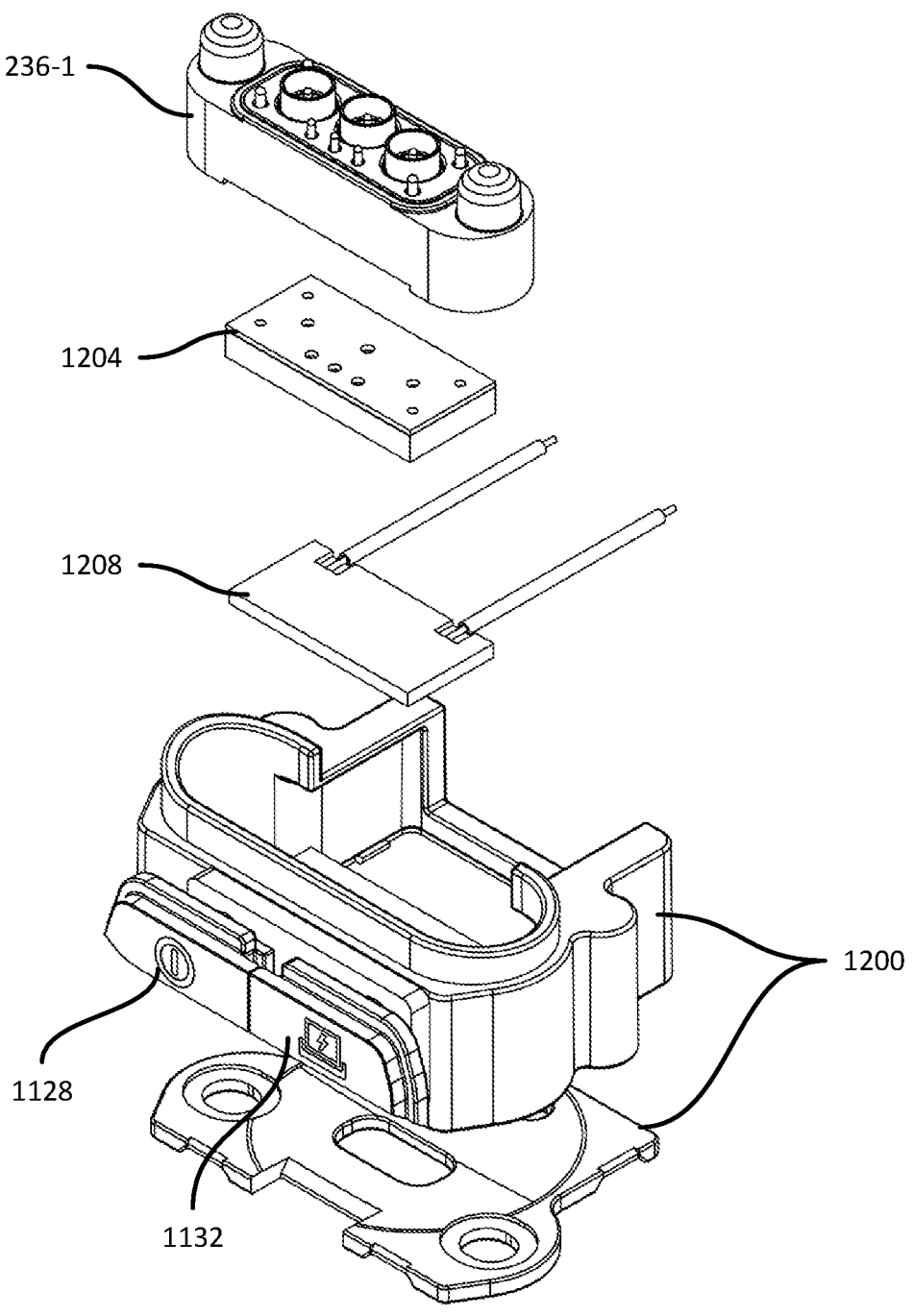
FIG. 12 is an exploded diagram of a connector of the dock of FIG. 8.

Turning to FIG. 12, the connectors 236-1 and/or 236-2 can include an integrated heating element, e.g., to mitigate the formation of ice on the connectors 236-1 and/or 236-2 in low-temperature operating conditions. FIG. 12 illustrates an exploded view of the connector 236-1 and surrounding components, including a connector housing 1200 and a set of electrical contacts 1204 configured to interconnect the connector 236-1 with the controller 1120 (e.g., via a flex cable or the like, not shown). The dock 100 also includes a heater 1208, e.g., disposed between the housing 1200 and the contacts 1204. The controller 1120 can be configured to enable the heater 1208 based on the ambient temperature (e.g., sensed via a temperature sensor disposed on an exterior surface of the dock 100), the temperature of the connector 236-1 itself (e.g., sensed via a temperature sensor integrated with the connector 236-1 or the contacts 1204), and whether the computing device 100 is present in the dock 100.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A dock for a computing device, the dock comprising:
a housing including a cradle end wall defining a closed end of a channel configured to receive a computing device along a travel direction, and a rear cradle wall extending between the cradle end wall and an open end of the channel;
a latch movably supported at the rear cradle wall between (i) an engaged position extending into the channel to engage with the computing device, and (ii) a retracted position withdrawn from the channel to disengage from the computing device;
a bias member configured to bias the latch towards the engaged position to automatically engage with the computing device in response to insertion of the computing device into the channel; and
an actuator coupled to the latch, the actuator configured to movably engage with a protrusion extending toward an opening in a back wall of the housing and transition the latch to the retracted position for releasing the computing device from the channel by moving the protrusion in a direction toward the channel,
wherein:
the housing defines a latch chamber open at the rear cradle wall,
the latch is rotatably supported within the latch chamber between the engaged and retracted positions,
the back wall of the housing is disposed on an opposite side of the rear wall from the channel, and
the latch chamber being open to an exterior of the dock at the back wall.

2. The dock of claim 1, wherein the cradle end wall is substantially perpendicular to the travel direction, and wherein the rear cradle wall is substantially parallel to the travel direction.

3. The dock of claim 1, further comprising a retention element extending from the rear cradle wall to engage with computing device.

4. The dock of claim 3, wherein the retention element includes a resilient roller rotatably supported within the latch chamber.

5. The dock of claim 1, wherein the latch includes (i) an arm extending from an axis of rotation towards the channel, and (ii) the protrusion extending from the latch chamber through the back wall to the exterior of the dock.

6. The dock of claim 5, wherein the actuator includes a button disposed at the back wall and configured to movably engage with the protrusion.

7. The dock of claim 5, wherein the bias member includes a spring disposed at the axis of rotation.

8. The dock of claim 5, wherein the arm extends from the axis of rotation in a first direction towards the cradle end wall, and wherein the protrusion extends from the axis of rotation in a second direction away from the cradle end wall.

9. The dock of claim 8, wherein a distal end of the arm and the axis of rotation define a segment having an angle of less than forty-five degrees relative to the direction of travel.

10. The dock of claim 1, wherein the cradle end wall includes a primary electrical connector configured to engage with the computing device; and wherein the latch is disposed in line with the primary connector along the travel direction.

11. The dock of claim 10, wherein a distance between the latch and the cradle end wall is smaller than a distance between the latch and the open end of the channel.

12. The dock of claim 10, wherein the housing includes an input/output (I/O) chamber, the I/O chamber containing a secondary connector configured to interconnect the primary connector and an external device; and wherein the rear cradle wall is open to the I/O chamber.

13. The dock of claim 12, further comprising a cover movably supported over the I/O chamber and accessible from the rear cradle wall.

14. The dock of claim 12, wherein access to the I/O chamber is obstructed by the computing device when the computing device is inserted into the channel.

15. The dock of claim 1, wherein the latch is disposed proximal to a first side of the channel, and wherein the dock further comprises:

a second latch disposed proximal to a second side of the channel; and a transfer member coupled between the latch and the second latch, configured to disengage the second latch in response to disengagement of the latch via the actuator.

16. The dock of claim 1, wherein the housing further comprises a side wall extending from the cradle end wall towards the open end of the channel; and a guide rail extending into the channel from the side wall, configured to engage with a corresponding groove of the computing device.

17. The dock of claim 1, further comprising:

a locking member supported by the housing and movable between a locked position to obstruct transition of the latch to the retracted position, and an unlocked position to permit transition of the latch to the retracted position.

18. The dock of claim 17, further comprising:

a lock configured to engage with the locking member to prevent movement of the locking member.

19. The dock of claim 1, further comprising:

an indicator light;

a sensor configured to detect a position of the latch; and a controller configured to control the indicator light based on the detected position of the latch.

20. The dock of claim 1, further comprising:

a connector configured to electrically connect with the computing device;

a heater mounted to the connector; and a controller configured to enable or disable the heater.

21. A dock for a computing device, the dock comprising:

a housing including a cradle end wall defining a closed end of a channel configured to receive a computing device along a travel direction, and a rear cradle wall extending between the cradle end wall and an open end of the channel;

a latch movably supported at the rear cradle wall between (i) an engaged position extending into the channel to engage with the computing device, and (ii) a retracted position withdrawn from the channel to disengage from the computing device;

a bias member configured to bias the latch towards the engaged position to automatically engage with the computing device in response to insertion of the computing device into the channel; and an actuator coupled to the latch, the actuator configured to movably engage with a protrusion extending toward an opening in a back wall of the housing and transition the latch to the retracted position for releasing the computing device from the channel by moving the protrusion in a direction toward the channel, wherein:

the housing defines a latch chamber open at the rear cradle wall, the latch is rotatably supported within the latch chamber between the engaged and retracted positions, the latch includes (i) an arm extending from an axis of rotation towards the channel, and (ii) the protrusion extending from the latch chamber through the back wall to the exterior of the dock.

* * * * *